US012243416B1

(12) United States Patent
Rothenberg et al.

(10) Patent No.: US 12,243,416 B1
(45) Date of Patent: Mar. 4, 2025

(54) VEHICLE LOCATION ASSISTANCE USING AUDIBLE SIGNALS

(71) Applicant: Waymo LLC, Mountain View, CA (US)

(72) Inventors: Juliet Rothenberg, San Francisco, CA (US); Kiran Kaja, Santa Clara, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/206,115

(22) Filed: Jun. 6, 2023

Related U.S. Application Data

(63) Continuation of application No. 17/518,683, filed on Nov. 4, 2021, now Pat. No. 11,710,399, which is a continuation of application No. 16/749,094, filed on Jan. 22, 2020, now Pat. No. 11,195,409, which is a continuation of application No. 16/138,070, filed on Sep. 21, 2018, now Pat. No. 10,580,291.

(60) Provisional application No. 62/563,997, filed on Sep. 27, 2017.

(51) Int. Cl.
*G08G 1/005* (2006.01)
*B60Q 5/00* (2006.01)
*G01C 21/34* (2006.01)
*G05D 1/00* (2006.01)

(52) U.S. Cl.
CPC .............. *G08G 1/005* (2013.01); *B60Q 5/00* (2013.01); *B60Q 5/005* (2013.01); *B60Q 5/006* (2013.01); *G01C 21/3438* (2013.01); *G05D 1/0088* (2013.01)

(58) Field of Classification Search
CPC .......... G08G 1/005; B60Q 5/00; B60Q 5/005; B60Q 5/006; G01C 21/3438
See application file for complete search history.

(56) References Cited

U.S. PATENT DOCUMENTS

| | | |
|---|---|---|
| 6,489,921 B1 | 12/2002 | Wilkinson |
| 6,529,142 B2 | 3/2003 | Yeh et al. |
| 6,580,368 B1 | 6/2003 | Jacobs |
| 6,828,907 B1 | 12/2004 | Galle |
| 7,148,802 B2 | 12/2006 | Abbruscato |

(Continued)

FOREIGN PATENT DOCUMENTS

FR 2971353 A1 8/2012

OTHER PUBLICATIONS

Translation of Lemaire [FR 297 1353] from Espacenet (Year: 2021).

*Primary Examiner* — John A Tweel, Jr.
(74) *Attorney, Agent, or Firm* — Botos Churchill IP Law

(57) ABSTRACT

Aspects of the present disclosure relate to using audible cues to guide a passenger to a vehicle having an autonomous driving mode. For instance, one or more processors of the vehicle may receive, from a server computing device, instructions to pick up the passenger at a pickup location. The one or more processors may maneuver the vehicle towards the pickup location in the autonomous driving mode. The one or more processors may receive a signal indicating that the passenger requests assistance locating the vehicle. The one or more processors may use the signal to generate the audible cues. The audible cues may be played by the one or more processors through a speaker of the vehicle in order to guide the passenger towards the vehicle.

20 Claims, 10 Drawing Sheets

(56) References Cited

U.S. PATENT DOCUMENTS

| | | |
|---|---|---|
| 7,911,337 B2 | 3/2011 | King et al. |
| 8,004,400 B2 | 8/2011 | Tieman et al. |
| 8,060,109 B2 | 11/2011 | Fomukong et al. |
| 8,380,430 B2 | 2/2013 | Malone et al. |
| 8,392,118 B2 | 3/2013 | Korn et al. |
| 8,521,419 B2 | 8/2013 | Korn et al. |
| 9,377,315 B2 | 6/2016 | Grover et al. |
| 9,836,057 B2 | 12/2017 | Fairfield et al. |
| 9,881,503 B1 | 1/2018 | Goldman-Shenhar et al. |
| 9,928,734 B2 | 3/2018 | Newman |
| 10,152,884 B2 | 12/2018 | Frederick et al. |
| 10,248,119 B2 | 4/2019 | Kentley-Klay et al. |
| 10,580,291 B1 | 3/2020 | Rothenberg et al. |
| 10,647,250 B1 | 5/2020 | Diehl et al. |
| 10,696,222 B1 | 6/2020 | Pandit et al. |
| 10,714,116 B2 | 7/2020 | Tintor et al. |
| 11,001,199 B1 | 5/2021 | Galliano et al. |
| 11,195,409 B1 | 12/2021 | Rothenberg et al. |
| 11,710,399 B1 * | 7/2023 | Rothenberg ............. B60Q 5/00 340/988 |
| 2008/0048909 A1 | 2/2008 | Ioffe et al. |
| 2008/0094254 A1 | 4/2008 | Hill |
| 2010/0161209 A1 * | 6/2010 | Vaghefinazari .... G01C 21/3685 701/533 |
| 2011/0148578 A1 | 6/2011 | Aloi et al. |
| 2014/0028477 A1 | 1/2014 | Michalske |
| 2017/0043707 A1 | 2/2017 | Kirchner |
| 2017/0178269 A1 | 6/2017 | McKinnon et al. |
| 2017/0277191 A1 | 9/2017 | Fairfield et al. |
| 2017/0344010 A1 | 11/2017 | Rander et al. |
| 2018/0050635 A1 | 2/2018 | Vincent et al. |
| 2018/0196415 A1 | 7/2018 | Iagnemma et al. |

* cited by examiner

VEHICLE LOCATION ASSISTANCE USING AUDIBLE SIGNALS

CROSS-REFERENCE TO RELATED APPLICATIONS

The present application is a continuation of U.S. patent application Ser. No. 17/518,683 filed Nov. 4, 2021, which is a continuation of U.S. patent application Ser. No. 16/749,094 filed Jan. 22, 2020, now issued as U.S. Pat. No. 11,195,409, which is a continuation of U.S. patent application Ser. No. 16/138,070 filed Sep. 21, 2018, now issued as U.S. Pat. No. 10,580,291, which claims the benefit of the filing date of U.S. Provisional Patent Application No. 62/563,997 filed Sep. 27, 2017, the disclosures of which are hereby incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

When a person (or user) wants to be physically transported between two locations via a vehicle, they may use any number of taxi services. To date, these services typically involve a human driver who is given dispatch instructions to a location to pick up the user, or rather, the passenger. Typically, the driver is able to communicate by waving down the passenger or speaking to them. This may not always be the case for an autonomous vehicle with an assigned passenger.

These problems may be compounded for blind passengers or passengers with visual impairments as they may not be able to recognize an assigned vehicle by looking at the vehicle. In addition, such passengers may not be able to identify a safe route from where they are waiting to where the vehicle has stopped to pick up the passenger. At the same time, when picking up a passenger, the vehicle may stop on the wrong side of the street, down the street, or around the corner. Thus, visually impaired passengers may not be aware of their actual location in relation to the destination (or an entrance at the destination). Moreover, crossing the street or walking through a parking lot to get to the vehicle or a destination may therefore be especially inconvenient and dangerous for these passengers.

BRIEF SUMMARY

One aspect of the disclosure provides a method of using audible cues to guide a passenger to a vehicle having an autonomous driving mode. The method includes receiving, by one or more processors of the vehicle from a server computing device, instructions to pick up the passenger at a pickup location: maneuvering, by the one or more processors, the vehicle towards the pickup location in the autonomous driving mode: receiving, by the one or more processors, a signal indicating that the passenger requests assistance locating the vehicle: using, by the one or more processors, the signal to generate the audible cues; and playing, by the one or more processors, the audible cues through a speaker of the vehicle in order to guide the passenger towards the vehicle.

In one example, the signal indicates that the passenger is visually impaired. In another example, the method also includes, determining when the vehicle is within a certain distance from the pickup location, and wherein the audible cues are played based on the determination. In another example, the method also includes, when the vehicle is within a certain distance from the pickup location, identifying a pull over location to stop the vehicle to wait for the passenger, and wherein the audible cues are played based on the identification. In this example, stopping the vehicle at the pull over location, and wherein playing the audible cues includes beginning to play the audible cues before the vehicle is stopped at the pull over location. In another example, the method also includes, when the vehicle is within a certain distance from the pickup location, identifying a pull over location to stop the vehicle to wait for the passenger and stopping the vehicle in the pull over location, and playing the audible cues includes beginning to play the audible cues only after the vehicle is stopped at the pull over location. In another example, the method also includes receiving authentication information from the server computing device and using the authentication information to authenticate a client computing device of the passenger and thereby establishing a communication link between the client computing device of the passenger and the one or more processors, and playing the audible cues includes playing the audible cues only after the communication link is established.

In another example, the method also includes receiving authentication information from the server computing device: using the authentication information to authenticate a client computing device of the passenger and thereby establishing a communication link between the client computing device of the passenger and the one or more processors; and after authenticating the client computing device, opening a door of the vehicle, and wherein playing the audible cues includes playing the audible cues only after the door is opened. In another example, the method also includes, receiving a second signal generated by a client computing device of the vehicle, the second signal indicating a request by the passenger to play the audible cues, and wherein playing the audible cues is in response to receiving the second signal. In this example, the method also includes receiving authentication information from the server computing device and using the authentication information to authenticate a client computing device of the passenger and thereby establishing a communication link between the client computing device of the passenger and the one or more processors, and the second signal is received over the communication link. In another example, the method also includes sending status information indicating a current status of the vehicle to a client computing device of the vehicle in order to indicate to the passenger that the vehicle is able to make audible cues to guide the passenger to the vehicle. In this example, the status information indicates that the vehicle has been stopped and waiting for the passenger for at least a predetermined period of time.

In another example, the signals are received from a client computing device of the passenger. In another example, the method also includes, using the signal to determine how long the vehicle should wait for the passenger. In another example, playing the audible cues includes increasing or decreasing volume of sounds of the audible cues over time. In this example, the method also includes identifying that the passenger is moving away from the vehicle, and wherein playing the audible cues includes decreasing volume of the audible cues based on the identification. Alternatively, the method also includes identifying that the passenger is approaching the vehicle, and wherein playing the audible cues includes increasing volume of the audible cues based on the identification. In another example, playing the audible cues includes increasing or decreasing a tempo of sounds of the audible cues over time. In this example, the method also includes identifying that the passenger is moving towards the vehicle, and wherein playing the audible cues includes increasing the tempo of the audible cues based on the identification. In another example, the method also includes identifying that the passenger is moving away from the vehicle, and wherein playing the audible cues includes decreasing the tempo of the audible cues based on the identification. In another example, the method also includes, when the vehicle is within a certain distance from the pickup location, identifying a pull over location to stop the vehicle to wait for the passenger, and playing the audible cues includes changing sounds played through the speaker based on the identification.

In another example, the method also includes, when the vehicle is within a certain distance from the pickup location, identifying a pull over location to stop the vehicle to wait for the passenger, and playing the audible cues includes changing sounds played through the speaker based on the identification. In another example, the method also includes when the vehicle is within a certain distance from the pickup location, identifying a pull over location to stop the vehicle to wait for the passenger and stopping the vehicle at the pull over location, and playing the audible cues includes changing sounds played through the speaker according to the instructions to change over time based stopping the vehicle. In another example, the audible cues are played until the passenger has reached and entered the vehicle. In another example, the audible cues are played until user input is received at a user input device of the vehicle indicating that the passenger is ready to start a trip. In another example, the audible cues are played for a predetermined period of time. In another example, the audible cues include a word or phrase. In another example, the audible cues include a song. In another example, the signal identifies a specific sound requested by the passenger. In another example, the audible cues include one or more instructions to assist the passenger in reaching the vehicle. In another example, the method also includes receiving sensor data from a perception system of the vehicle, and wherein generating the audible cues is further based on the sensor data. In another example, the audible cues include sounds identifying one or more objects detected by the perception system and included in the sensor data. In another example, generating the audible cues is further based on features identified in map information used to maneuver the vehicle in the autonomous driving mode.

Another aspect of the disclosure provides a system for using audible cues to guide a passenger to a vehicle having an autonomous driving mode. The system includes one or more processors configured to perform any of the example methods described above. In one example, the system also includes the vehicle.

DETAILED DESCRIPTION

Overview

Figure 1:
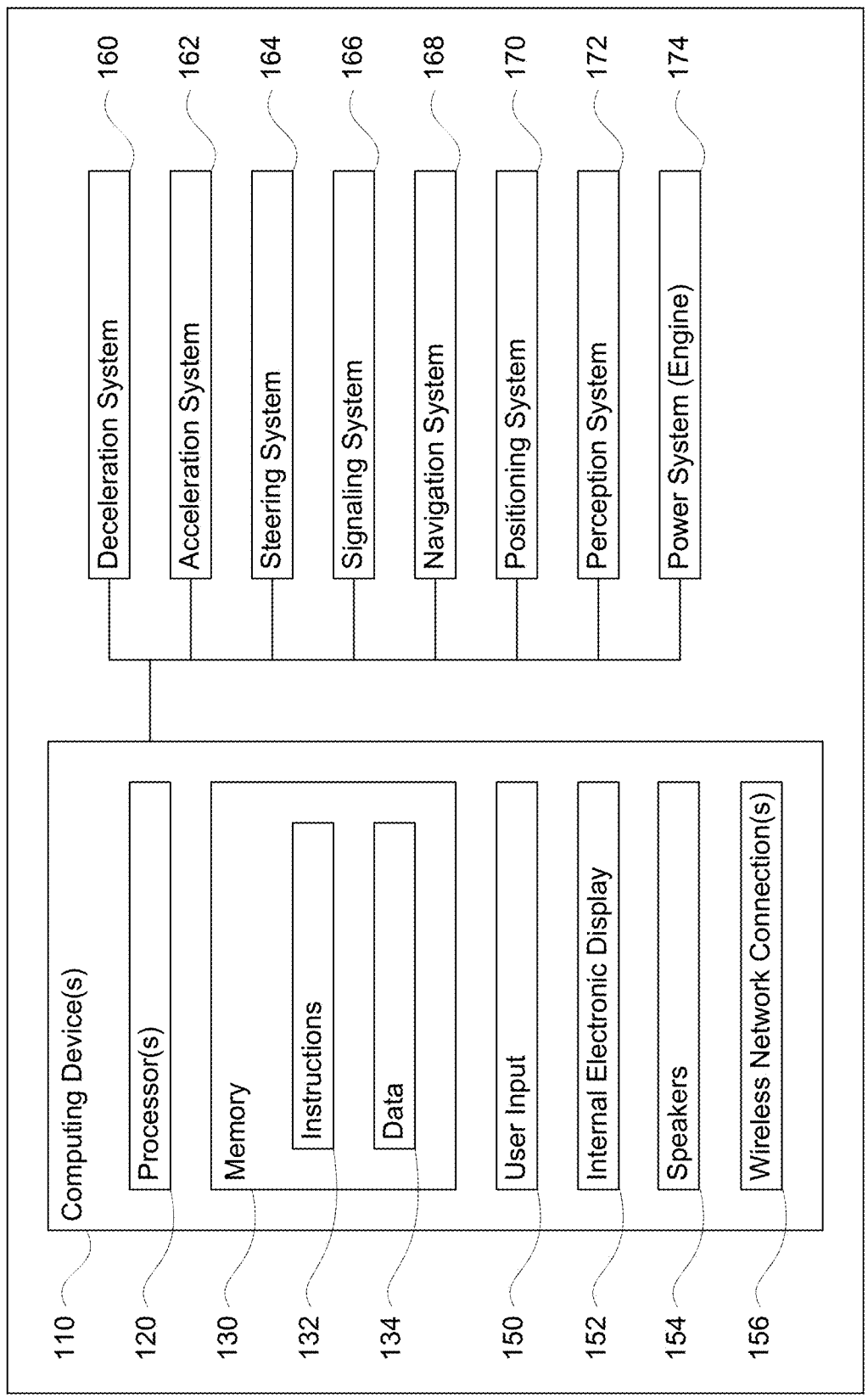
FIG. 1 is a functional diagram of an example vehicle in accordance with an exemplary embodiment.

The technology relates to providing visually impaired passengers or passengers who would like additional assistance, to locate an assigned vehicle using audible cues. For instance, a user may request transportation services from a transportation service. A vehicle may be assigned to the user (or passenger) by one or more server computing devices. The server computing devices may provide dispatching instruction to the vehicle to pick up the assigned passenger at a pickup location. The vehicle's computing devices may then control the vehicle to stop and wait for the passenger at a location proximate to the pickup location. As noted above, a passenger with visual impairments may have a difficult time finding a vehicle which has been assigned to that passenger. As such, the server computing devices may provide the assigned vehicle with additional signals to indicate that the passenger may need additional assistance finding the vehicle. The assigned vehicle may then use these additional signals to provide audible cues in order to guide the passenger towards the vehicle.

To facilitate the use of the audible cues, a passenger may select one or more settings which indicate that the passenger would like assistance (or additional assistance) locating the vehicle. These settings may be available to all users of the vehicle services described herein, including those with or without vision hearing impairments.

The audible cues may be played through the one or more speakers of the vehicle, and in particular, those located externally to the vehicle. In this way, the audible cues may help to guide the passenger towards the vehicle. The signals may continue for some predetermined period of time, until the passenger has reached and entered the vehicle, until the passenger has used a user input of the vehicle to initiate a trip to the passenger's destination, or some other time.

In one example, once the vehicle is within a certain distance, in time or space, from the pickup location, vehicle's computing may use the additional signals to automatically begin providing audible cues to the passenger. As an alternative, the vehicle's computing devices may use the additional signals to provide the audible cues once the vehicle has identified, but before the vehicle has actually reached, a pull over location, or a location where the vehicle is able to stop and wait for the passenger. As another alternative, the vehicle's computing may use the additional signals to provide the audible cues to the passenger only after the vehicle has come to a complete stop. In another alternative, the audible cues may begin once a client computing device of an assigned passenger has been authenticated by the vehicle's computing devices. In a similar example, the audible cues may begin once client computing device of the assigned passenger has been authenticated by the vehicle's computing devices and the vehicle's computing devices have unlocked and/or opened the vehicle's doors to allow the passenger to enter the vehicle.

The client computing device may be provided with information about the status of the vehicle. This may include when the vehicle is within a certain distance in time or space from the pickup location, when the vehicle's client computing devices have found a pull over location, when the vehicle is pulling over, when the vehicle has come to a complete stop in the pull over location, when the vehicle is waiting for the passenger, when the vehicle is making the audible cues, when the client computing device has been authenticated, when the vehicle's doors are unlocked or opened, etc. The application on the client computing device may use this information to provide information to the passenger in order to further assist the passenger in identifying the vehicle.

In this regard, the passenger may initiate the audible cues using his or her client computing device based on information about the status of the vehicle. In response, the client computing device of the passenger may provide a button or option, for instance by surfacing a button or option on the display of the client computing device. The button or option may allow the passenger to initiate the audible cues at the vehicle.

If the passenger chooses to do so, he or she may use the button. In response, the client computing device of the passenger may send a signal to the vehicle's computing devices. Once the vehicle's computing devices receive the signal initiated by the client computing device of the passenger, the vehicle's computing devices may use the signal, in some instances in combination with the additional signals, to initiate the audible cues.

In addition or alternatively, the application may provide the button or option described above once the vehicle has been stopped and waiting for the passenger for a predetermined period of time. In addition or alternatively, the audible cues may change over time and may even indicate whether the passenger appears to be approaching or moving away from the vehicle. In some instances, the context of any phrases may even be augmented by information provided by the vehicle's perception system and gleaned from the map information.

The audible cues may include beeping and chirping noises as well as songs, words, or phrases. In some instances, the tone or words of the audible cues may be personalized or set by the passenger via the client computing device of the passenger and provided to the vehicle with the additional signals by the server computing devices.

To further increase the effectiveness of the audible cues, a microphone of the client computing device of the passenger may be to record information about the sounds the passenger can hear. This information may then be to adjust the audible cues or provide instructions to the passenger at the vehicle, the client computing device of the passenger, or both.

EXAMPLE SYSTEMS

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more control computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions 132 and the data 134 are stored on different types of media.

The instructions 132 may be any set of instructions to be executed directly (such as machine code) or indirectly (such as scripts) by the processor. For example, the instructions 132 may be stored as computing device code on the computing device-readable medium. In that regard, the terms "instructions" and "programs" may be used interchangeably herein. The instructions 132 may be stored in object code format for direct processing by the processor, or in any other computing device language including scripts or collections of independent source code modules that are interpreted on demand or compiled in advance. Functions, methods and routines of the instructions 132 are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may include all of the components normally used in connection with a computing device such as the processor and memory described above as well as user inputs 150 (e.g., a mouse, keyboard, touch screen and/or microphone, buttons, etc.) and various electronic displays (e.g., a monitor having a screen or any other electrical device that is operable to display information). In this example, the vehicle includes an internal electronic display 152 (all or part of which may be incorporated into the user inputs 150) as well as one or more speakers 154 to provide information or audio visual experiences. In this regard, internal electronic display 152 may be located within a cabin of vehicle 100 and may be used by computing device 110 to provide information to passengers within the vehicle 100. The speakers 154 may include one or more internal and external speakers which can be used individually or in concert to provide audible information, including cues, to a passenger of the vehicle or any persons outside of the vehicle as discussed further below. For instance, these external speakers placed at multiple locations around the vehicle, such as on the "driver" and "passenger" sides of the vehicle where sounds from the speakers would not be muffled to an unacceptable level by other components of the vehicle.

Computing device 110 may also include one or more wireless network connections 156 to facilitate communication with other computing devices, such as the client computing devices and server computing devices described in detail below. The wireless network connections may include short range communication protocols such as Bluetooth (R), Bluetooth (R) low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may be capable of communicating with various components of the vehicle in order to control the movement of vehicle 100 according to primary vehicle control code of memory 130. For example, returning to FIG. 1, computing device 110 may be in communication with various systems of vehicle 100, such as deceleration system 160, acceleration system 162, steering system 164, signaling system 166, navigation system 168, positioning system 170, perception system 172, and power system 174 in order to control the movement, speed, etc. of vehicle 100 in accordance with the instructions 132 of memory 130. Again, although these systems are shown as external to computing device 110, in actuality, these systems may also be incorporated into computing device 110, again as an autonomous driving computing system for controlling vehicle 100.

As an example, computing device 110 may interact with one or more actuators of the deceleration system 160 and/or acceleration system 162, such as brakes, accelerator pedal, and/or the power system 174 (i.e. an engine or motor of vehicle 100), in order to control the speed of the vehicle. Similarly, one or more actuators of the steering system 164, such as a steering wheel, steering shaft, and/or pinion and rack in a rack and pinion system, may be used by computing device 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Navigation system 168 may be used by computing devices 110 in order to determine and follow a route to a location. In this regard, the navigation system 168 and/or the data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways.

Figure 2:
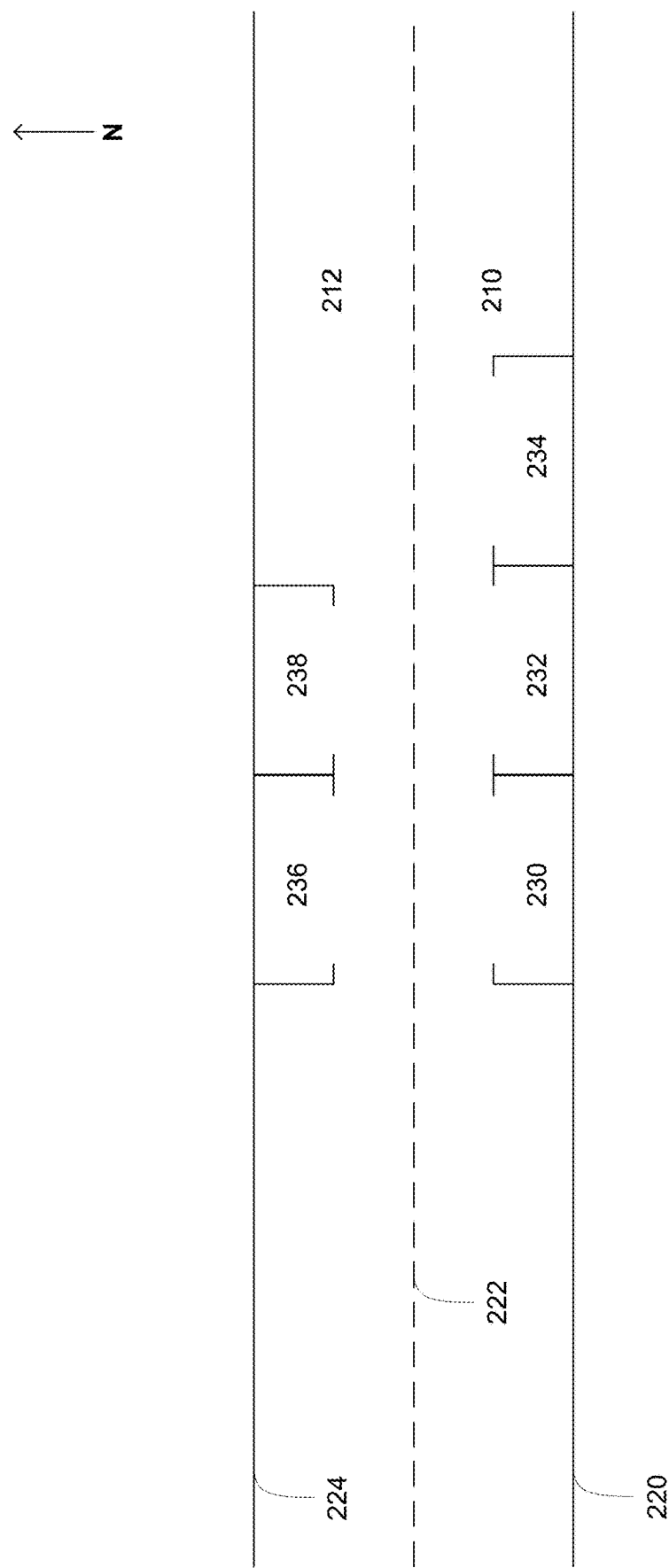
FIG. 2 is an example of map information in accordance with aspects of the disclosure.

FIG. 2 is an example of map information 200 for a section of roadway. The map information 200 includes information identifying the shape, location, and other characteristics of various road features. In this example, the map information includes two lanes 210, 212 bounded by curb 220, lane lines 222 and curb 224. Lane 210 has one direction of traffic flow (in an eastward direction), while lane 216 has an opposing traffic flow (in a westward direction). In addition, lanes 210 and 212 also include parking areas 230-238, for instance to allow for vehicles to park adjacent to curbs 220 or 224. Although the example of map information includes only a few road features, for instance, curbs, lane lines, and lanes, given the nature of the roadway, the map information 200 may also identify various other road features such as traffic signal lights, crosswalks, sidewalks, stop signs, yield signs, speed limit signs, road signs, etc. Although not shown, the detailed map information may also include information identifying speed limits and other legal traffic requirements as well as historical information identifying typical and historical traffic conditions at various dates and times.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 3:
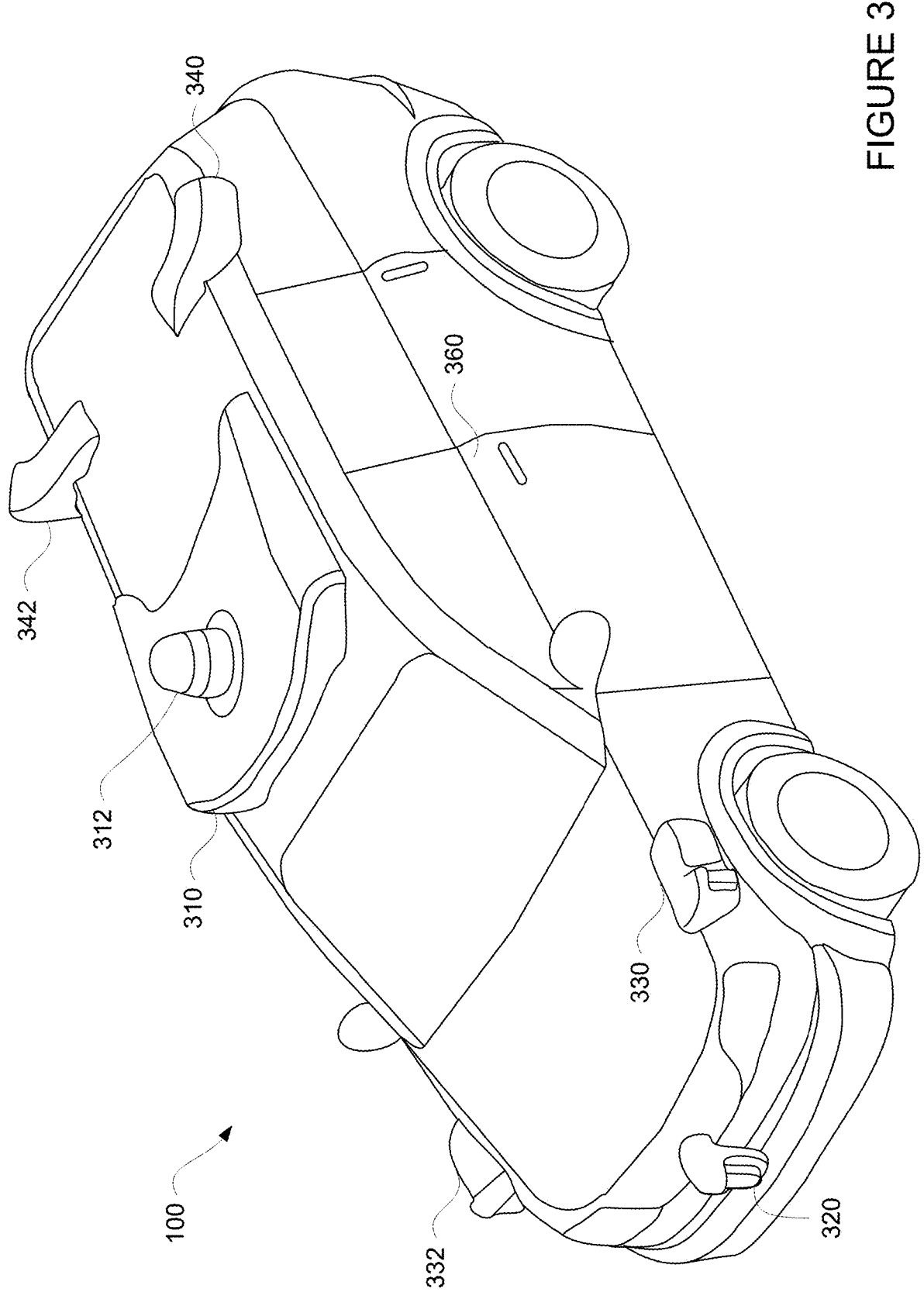
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a lidar sensor as well as various cameras and radar units. In addition, housing 320 located at the front end of vehicle 100 and housings 330, 332 on the driver's and passenger's sides of the vehicle may each store a lidar sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100.

The computing device 110 may control the direction and speed of the vehicle by controlling various components. By way of example, computing device 110 may navigate the vehicle to a destination location completely autonomously using data from the detailed map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing device 110 may also control the drivetrain of the vehicle in order to maneuver the vehicle autonomously.

The vehicle 100 may also include one or more inputs that when used by a passenger may communicate instructions from the passenger to the computing devices. For instance, the vehicle may include user inputs 150 such as a touch screen (as discussed above), a "go" button, a "stop" button (for emergency stopping), and/or a "pull over" button. By using these inputs, the passenger may communicate a desire to start or stop a trip to the client computing devices 110. The client computing devices 110 may respond to the input accordingly.

In addition to the features described above, the vehicle 100 may include all of the features of vehicles without autonomous driving modes at least some of which may be controlled by computing devices 110. This may include, for instance, a steering wheel, brake pedal, accelerator pedal, as well as automatic doors which the computing devices 110 may open when the vehicle is stopped and waiting to pick up or drop off a passenger.

Figure 4:
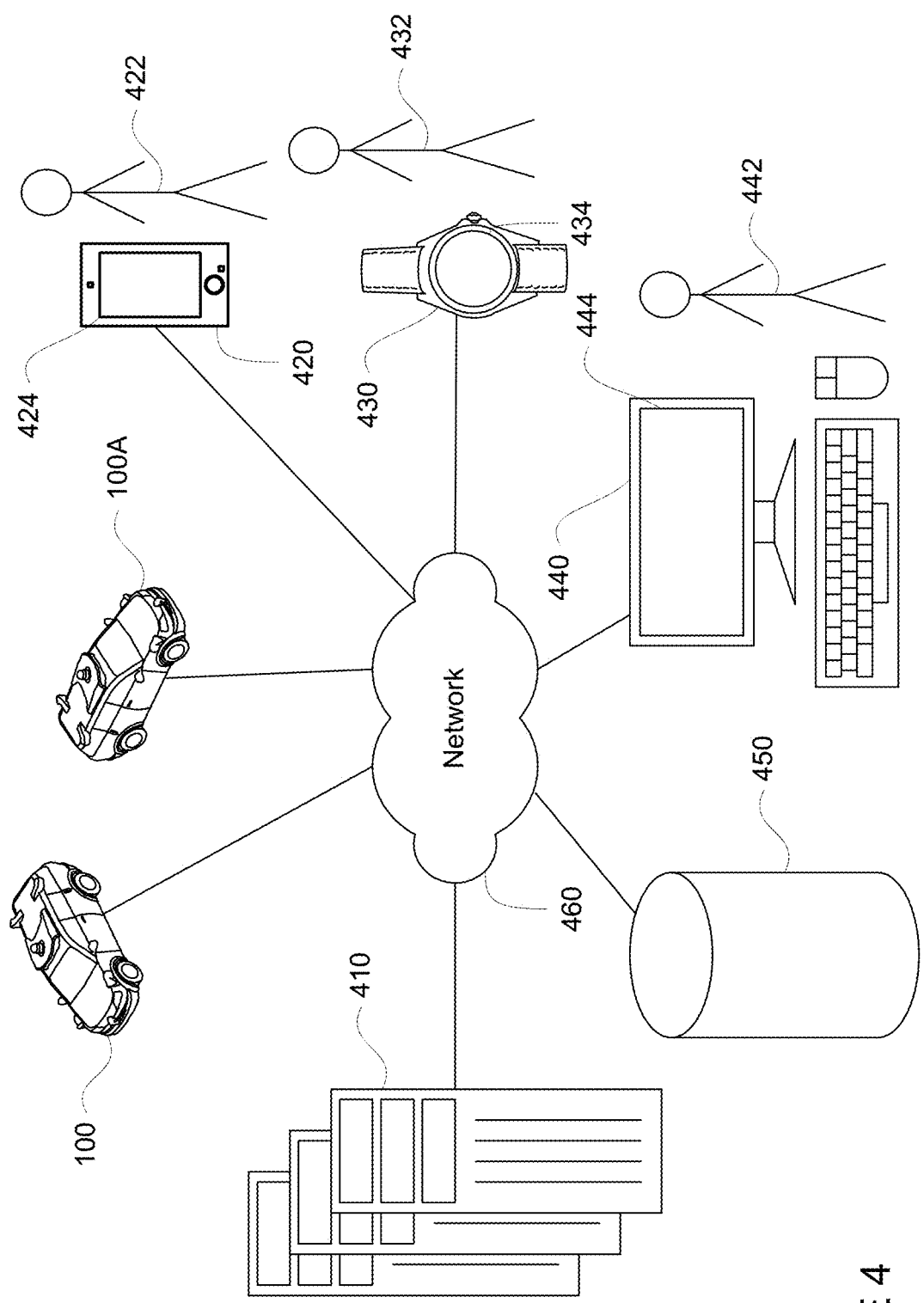
FIG. 4 is a pictorial diagram of an example system in accordance with an exemplary embodiment.
Figure 5:
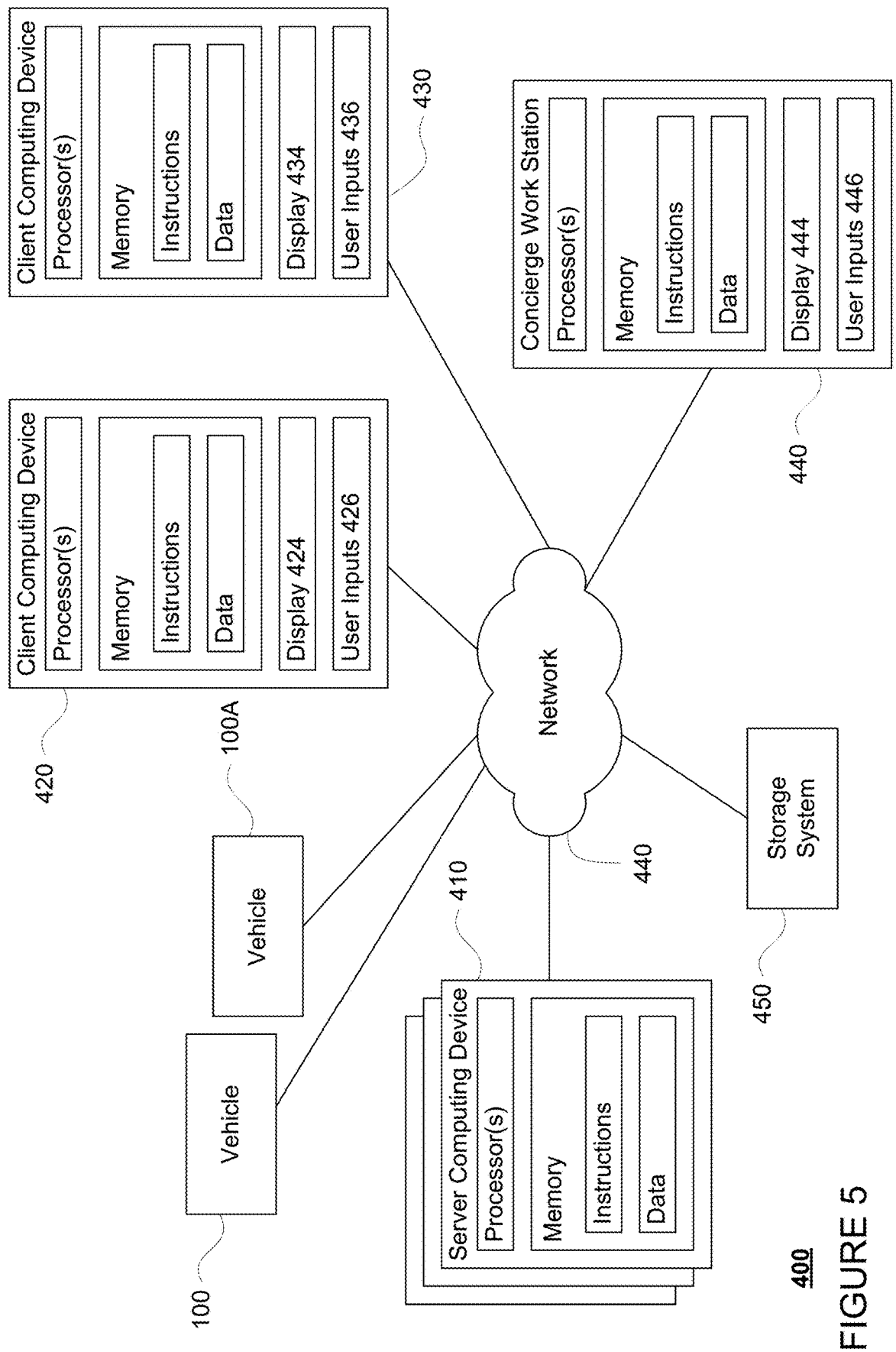
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicle 100A which may be configured similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 134, and instructions 132 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small key board, a keypad, microphone, using visual signals with a camera, or a touch screen.

In some examples, client computing device 440 may be a concierge work station used by an administrator to provide concierge services to users such as users 422 and 432. For example, user 442 may be a concierge who uses the concierge work station 440 to communicate via a telephone call or audio connection with users through their respective client computing devices or vehicles 100 or 100A in order to facilitate the safe operation of vehicles 100 and 100A and the safety of the users as described in further detail below. Although only a single concierge work station 440 is shown in FIGS. 4 and 5, any number of such work stations may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450) may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), one or more unique signals for the user as well as other user preference or settings data. The settings data may include settings which would indicate that the passenger requests assistance locating and/or identifying a vehicle. Such settings may include an "audio communication aid" or "hearing impaired" setting. These settings may be available to all users of the vehicle services described herein, including those with or without vision impairments. In addition, although the examples described herein discuss providing audible cues and other information on the basis of a user or passenger's settings, the audible cues may be provided as discussed herein for all passengers, regardless of such settings.

The storage system 450 may also store information which can be provided to client computing devices for display to a user. For instance, the storage system 450 may store predetermined distance information for determining an area at which a vehicle is likely to stop for a given pickup or destination location. The storage system 450 may also store graphics, icons, and other items which may be displayed to a user as discussed below.

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting transportation services, or rather a vehicle, to a client computing device. For example, users 422 and 432 may download the application via a link in an email, directly from a website, or an application store to client computing devices 420 and 430. For example, client computing device may transmit a request for the application over the network, for example, to one or more server computing devices 110, and in response, receive the application. The application may be installed locally at the client computing device.

The user may then use his or her client computing device to access the application and request a vehicle. As an example, a user such as user 432 may use client computing device 430 to send a request to one or more server computing devices 410 for a vehicle. As part of this, the user may identify a pickup location, a destination location, and, in some cases, one or more intermediate stopping locations anywhere within a service area where a vehicle can stop.

These pickup and destination locations may be predefined (e.g., specific areas of a parking lot, etc.) or may simply be any location within a service area of the vehicles. As an example, a pickup location can be defaulted to current location of the user's client computing device, or can be input by the user at the user's client device. For instance, the user may enter an address or other location information, select a location on a map to select a pickup location, or select from a set of predetermined or predefined locations (i.e. favorite locations) set by the passenger, the server computing device 410, or a third party.

In response to the request, server computing devices 410 may identify an available vehicle, such as vehicles 100 or 100A, and assign that vehicle to the user, now a passenger. For instance, the server computing devices 410 may assign vehicles based on proximity to the passenger's pick up location in time or distance, availability of vehicles, location of future expected trips for a vehicle relative to the passenger's destination, location of other users requesting trips to the same or nearby destinations (for ridesharing), etc.

Once a vehicle, such as vehicle 100, is assigned, the server computing devices 410 may send dispatch instructions to the vehicle. These instructions may identify a pickup location, a destination location, as well as authentication information for authenticating the client computing device of the user. In some instances, the dispatching instructions may also include additional signals which may indicate the passenger's account information includes one or more settings which would indicate that the passenger requests assistance locating and/or identifying a vehicle. Such settings may include an "audio communication aid" set to "active" or "on", or a "vision impaired" setting set to "active" or "on". As noted above, such setting may be made available to all users of the service. Alternatively, these additional signals may be sent to an assigned vehicle once that vehicle is within a predetermined distance in time or space from a pickup location.

In response to receiving the dispatching instructions, the computing devices 110 may maneuver vehicle 100 to the pickup location, for instance, in order to pick up the user, or passenger. In this regard, computing devices 110 may initiate the necessary systems to control the vehicle autonomously along a route to the destination location. For instance, the navigation system 168 may use the map information of data 134 to determine a path or route to the destination location using the map information 200. The computing devices 110 may then maneuver the vehicle autonomously (or in an autonomous driving mode) as described above along the route towards the destination.

Figure 6:
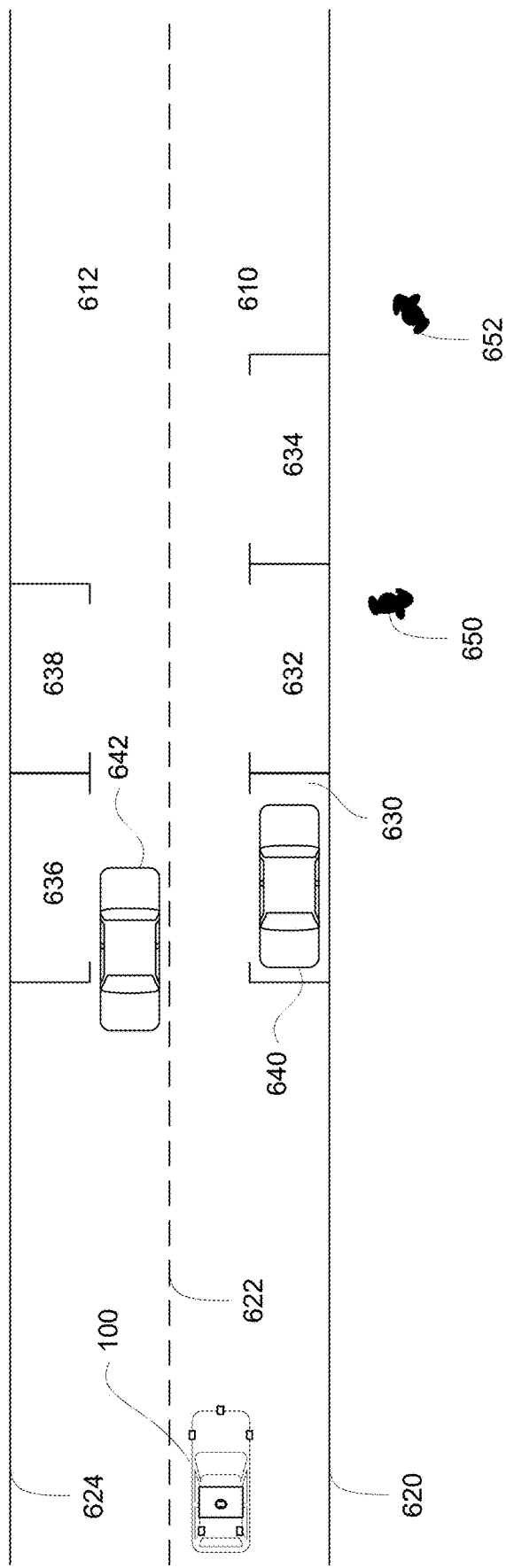
FIG. 6 is an example bird's eye view of a geographic area in accordance with aspects of the disclosure.

FIG. 6 is an example view of vehicle 100 driving along a roadway 600 corresponding to map information 200 of FIG. 2. In that regard, lanes 610 and 612 correspond to the shape, location and traffic flow of lanes 210 and 212, respectively.

Similarly, lane line 622 corresponds to the shape and location of lane line 222, and curbs 620, 624 correspond to the shape and location of curbs 220, 224, respectively. In this example, vehicle 100 is traveling east in lane 610.

Figure 7:
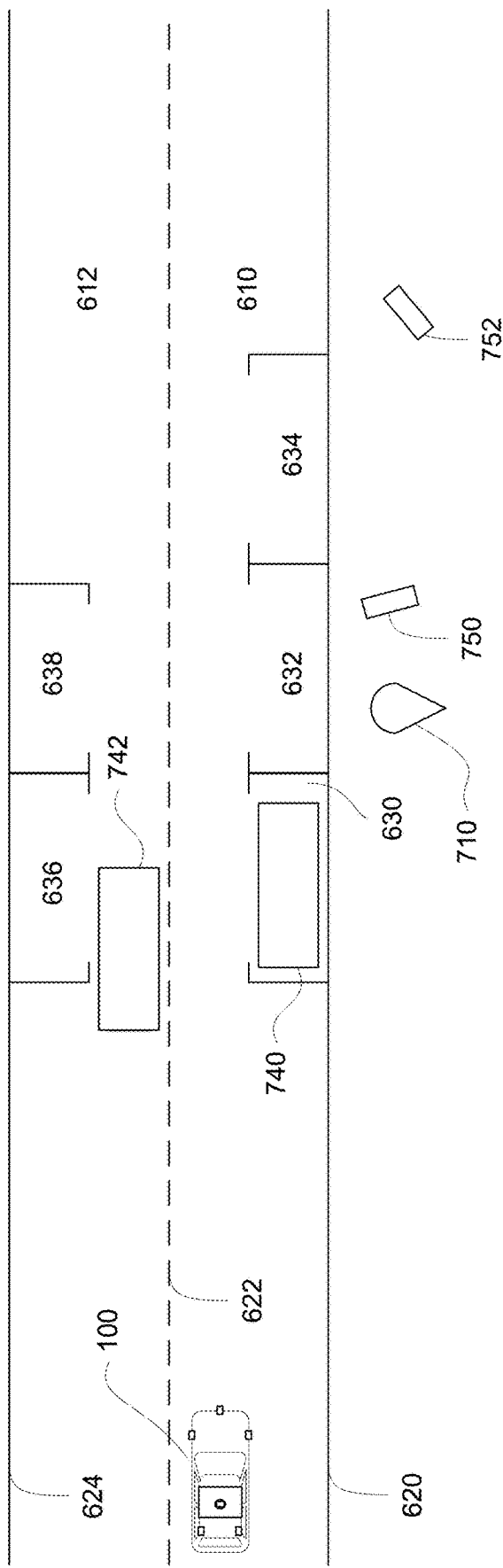
FIG. 7 is an example bird's eye view of the geographic area of FIG. 6 with additional data in accordance with aspects of the disclosure.

As the vehicle moves along lane 610, the perception system 172 provides the computing devices with sensor data regarding the shapes and location of objects, such as curbs 620, 624, lane line 622, and the features of parking spots 630-638 with corresponding features of the map information as discussed above. In addition, the sensor data may also identify vehicles 640, 642 and pedestrians 650, 652 as well as their characteristics, such as speed, location, heading, orientation, etc. FIG. 7 depicts a combination of the features of FIG. 6 with sensor data for vehicles 640, 642, represented by bounding boxes 740, 742, and pedestrians 650, 652, represented by bounding boxes 750, 752. In addition, FIG. 7 depicts marker 710 which represents a pickup location for the passenger assigned to vehicle 100.

In one example, once the vehicle is within a certain distance, in time or space, from the pickup location, such as 50 meters or more or less, the computing devices 110 may use the additional signals received from the server computing devices 410 to automatically begin providing audible cues to the passenger. These signals may include a beep or chirping noise which indicates that the vehicle is about to arrive or has arrived to pick up the passenger. The audible cues may be played through the one or more speakers 154 of the vehicle, and in particular, those located externally to the vehicle. In this way, the audible cues may provide a passenger with an indication from which direction the vehicle is approaching the passenger. The signals may continue for some predetermined period of time, until the passenger has reached and entered the vehicle (e.g. opened the door), until the passenger has used one of the user inputs 150 to initiate a trip to the passenger's destination, or some other time.

As an alternative, the computing devices may use the additional signals to provide the audible cues once the vehicle has identified, but before the vehicle has actually reached, a pull over location, or a location where the vehicle is able to stop and wait for the passenger. Once the vehicle is within a certain distance, such as 50 meters or more or less, in time or space of the pickup location, the computing devices 110 may begin to search for a location to stop the vehicle. In the example of FIG. 7, computing devices 110 may determine that parking spots 632 and 634, on the same side of the roadway as the pickup location (represented by marker 710), are available, while parking spot 630 is occupied by the bounding box 740 (representing vehicle 640). As such, the computing devices 110 may determine that parking spot 632 is closer to the pickup location (represented by marker 710).

At this point, once parking spot 632 is identified as a pull over location, the computing devices 110 may begin making the audible cue. Again, the audible cues may be played through the one or more speakers 154 of the vehicle, and in particular, those located externally to the vehicle. In this way, the audible cues may provide a passenger with an indication from which direction the vehicle is approaching the passenger. Again, these signals may continue for some predetermined period of time, until the passenger has reached and entered the vehicle (e.g. opened the door), until the passenger has used one of the user inputs 150 to initiate a trip to the passenger's destination, or some other time.

Figure 8:
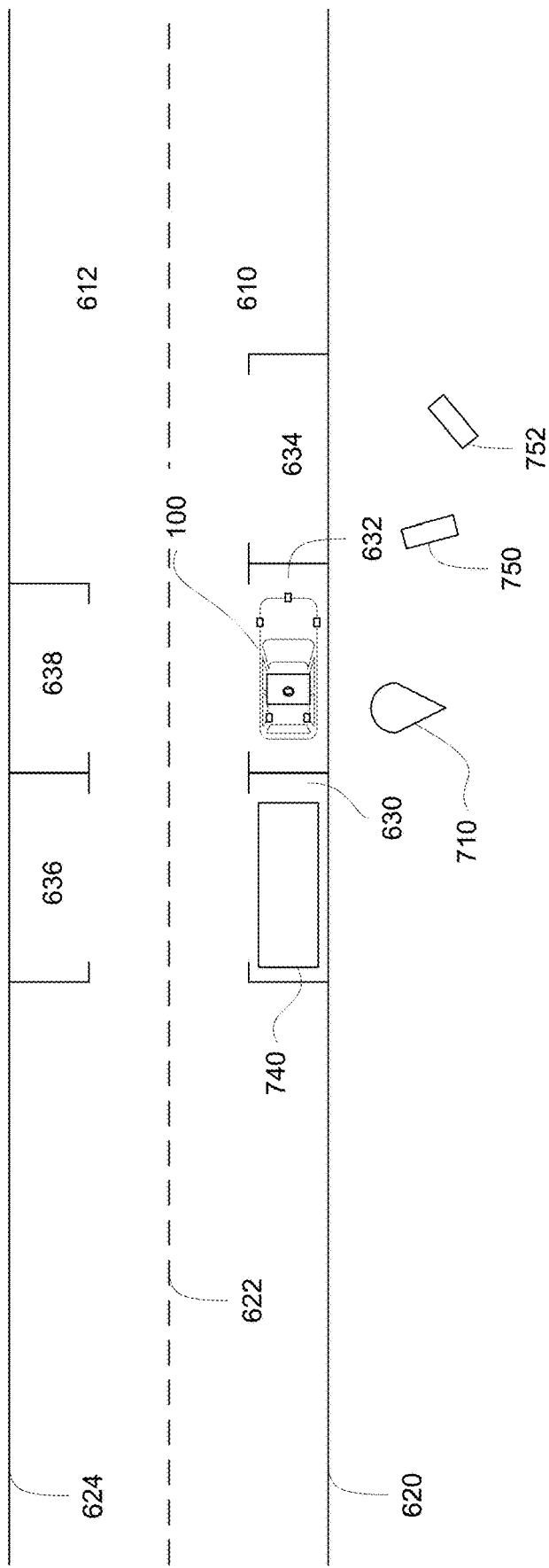
FIG. 8 is an example bird's eye view of the geographic area of FIG. 6 with additional data in accordance with aspects of the disclosure.

As another alternative, the computing devices 110 may use the additional signals to provide the audible cues to the passenger only after the vehicle has come to a complete stop. For instance, as shown in FIG. 8, vehicle 100 is now completely stopped in parking spot. At this point, the vehicle may begin to make the beep or chirping noise. Again, the audible cues may be played through the one or more speakers 154 of the vehicle, and in particular, those located externally to the vehicle. In this way, the audible cues may provide a passenger with an indication of where the vehicle is waiting for the passenger and thereby guide or lead the passenger towards the vehicle. Again, these signals may continue for some predetermined period of time, until the passenger has reached and entered the vehicle (e.g. opened the door), until the passenger has used one of the user inputs 150 to initiate a trip to the passenger's destination, or some other time.

In another example, the audible cues may begin once the vehicle is within a predetermined distance, for instance 50 meters or more or less, of the passenger's client computing device. In this regard, the server computing device 410 may provide the vehicle with information about the current location, for instance GPS location, of the client computing device. Again, the audible cues may be played through the one or more speakers 154 of the vehicle, and in particular, those located externally to the vehicle. Again, these signals may continue for some predetermined period of time, until the passenger has reached and entered the vehicle (e.g. opened the door), until the passenger has used one of the user inputs 150 to initiate a trip to the passenger's destination, or some other time.

In another alternative, the audible cues may begin once the client computing device 420 has been authenticated by the computing devices 110. For instance, the computing devices 110 may begin broadcasting a signal wirelessly, for instance, using Bluetooth R, protocols once the vehicle 100 is within a certain distance in time or space, such as 50 meters or more or less, of the pickup location. The client computing device may respond to these signals, providing authentication information to the computing devices 110. In response, the computing devices 110 may use the authentication information received from the server computing devices 410 and the authentication information from the client computing device to authenticate the client computing device. If successful, the computing devices 110 and client computing device may create a communication link in order to directly share information with one another. Once this link is created, the computing devices 110 may use the additional signals to provide the audible cues. Again, the audible cues may be played through the one or more speakers 154 of the vehicle, and in particular, those located externally to the vehicle. Again, these signals may continue for some predetermined period of time, until the passenger has reached and entered the vehicle (e.g. opened the door), until the passenger has used one of the user inputs 150 to initiate a trip to the passenger's destination, or some other time.

In a similar example, the audible cues may begin once the client computing device 420 has been authenticated by the computing devices 110 and the computing devices 110 have unlocked and/or opened the vehicle's doors to allow the passenger to enter the vehicle. Once this occurs, the computing devices 110 may use the additional signals to provide the audible cues. Again, the audible cues may be played through the one or more speakers 154 of the vehicle, and in particular, those located externally to the vehicle. Again, these signals may continue for some predetermined period of time, until the passenger has reached and entered the vehicle (e.g. opened the door), until the passenger has used one of the user inputs 150 to initiate a trip to the passenger's destination, or some other time.

In any of the examples discussed herein, the computing devices 110 and/or the server computing devices 410 may provide the client computing device 420 with information about the status of the vehicle. This may include when the vehicle is within a certain distance in time or space from the pickup location, when the computing devices 110 have found a pull over location, when the vehicle 100 is pulling over, when the vehicle has come to a complete stop in the pull over location, when the vehicle is waiting for the passenger, when the vehicle is making the audible cues, when the client computing device has been authenticated, when the vehicle's doors are unlocked or opened, etc. The application on the client computing device may use this information to provide information to the passenger in order to further assist the passenger in identifying the vehicle.

Figure 9:
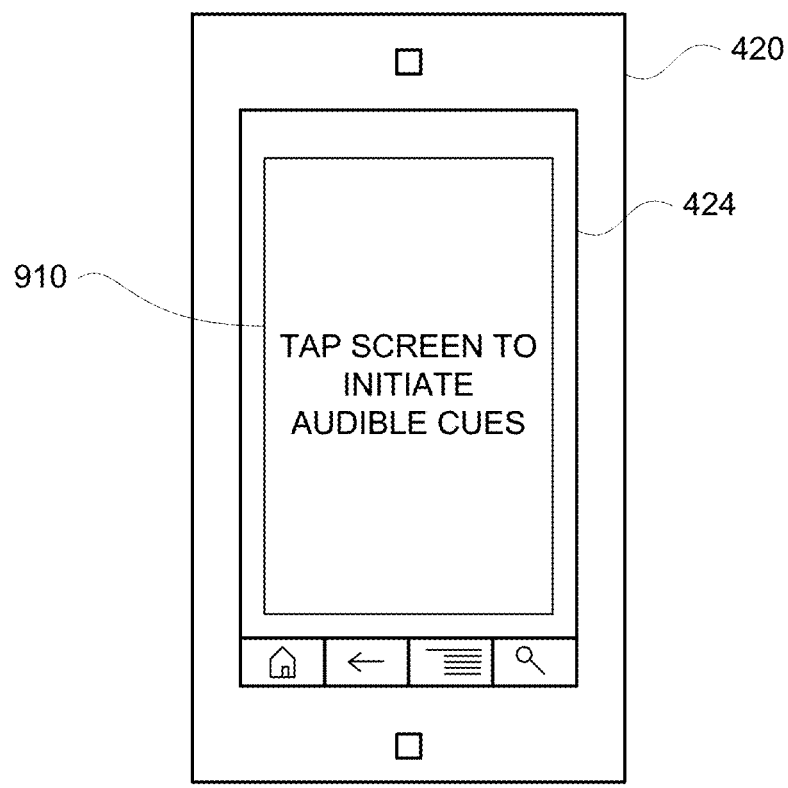
FIG. 9 is an example client computing device and notification in accordance with aspects of the disclosure.

In this regard, the passenger may initiate the audible cues using his or her client computing device based on information about the status of the vehicle. For instance, once the vehicle is within a certain distance, in time or space, of the pickup location, has identified a pull over location, has come to a complete stop in the pull over location, or is waiting for the passenger, this information may be provided to the client computing device 420. In response, using the passenger's settings, the application may provide a button or option, for instance by surfacing a button or option on the display of the client computing device 420. FIG. 9 depicts an example representation of a notification 910 displayed on display 424 of client computing device 420. The button or option may allow the passenger to initiate the audible cues. For instance, the application may cause the client computing device to vibrate, make a particular sound, or provide an audible notification with words indicating that the button is available for use.

If the passenger chooses to do so, he or she may use the button. In response, the client computing device, via the application, may send a signal to the computing devices 110. This signal may be sent wirelessly, for instance using Bluetooth (R) protocols, directly to the vehicle. In some instances, the signal may be sent via the communication link if the client computing device has already been authenticated, though this may not be required. In other instances, the signal may be sent via network 460 to the server computing devices 410 which may then relay the signal to the vehicle 100. Once the computing devices 110 receive the signal initiated by the client computing device 420, the computing devices 110 may use the signal, in some instances in combination with the additional signals, to initiate the audible cues. Again, the audible cues may be played through the one or more speakers 154 of the vehicle, and in particular, those located externally to the vehicle. Again, these signals may continue for some predetermined period of time, until the passenger has reached and entered the vehicle (e.g. opened the door), until the passenger has used one of the user inputs 150 to initiate a trip to the passenger's destination, or some other time.

In addition or alternatively, the application may provide the button or option described above once the vehicle has been stopped and waiting for the passenger for a predetermined period of time. For instance, after 2 minutes or more or less, the computing devices 110 may send a signal to the server computing devices 410 and/or directly to the client computing device 420 indicating that the passenger has not yet arrived. The server computing devices 410 may then relay this information to the client computing device 420. Once received by the client computing device, the application may use this information to provide the button or option described above to the passenger.

In addition to the audible cues, the computing devices 110 may use the additional signals to provide the passenger with additional time to reach and enter the vehicle. For instance, the application may include a setting that allows visually impaired or other users who may require additional time or assistance an increased amount of time to reach and enter the vehicle. This time may be up to twice as long as other riders receive, or more or less. In this regard, when the vehicle pulls over or stops to pick up a passenger who requests this additional time, the computing devices 110 may only stop in areas where such waiting is permitted. As such, stopping in a lane or in front of a driveway may not be appropriate in this case. In addition, this "additional time" may be used to determine the predetermined period of time for providing the button or option for the passenger to initiate the audible cues as discussed above.

In addition or alternatively, the audible cues may begin at any of the points discussed above (automatically or by user initiated input), and change over time. For instance, when the vehicle is within the certain distance of the pickup location when the audible cues begin, the tone of the beeping or chirping may change once the computing devices 110 have identified a pull over location. Similarly, when the audible cues are being played after the vehicle has identified a pull over location, the tone of the beeping or chirping may again change (or change for the first time) when the vehicle has come to a complete stop at the pull over location.

In addition, if the computing devices 110 are able to localize the passenger very well, for instance combining one or more of a GPS signal from the client computing device 420, a Bluetooth (R) signal from an authenticated client computing device, other information about the passenger (such as height, clothing, or other characteristics), and sensor data from the perception system 172, the computing devices may change the signal over time to indicate whether the passenger appears to be approaching or moving away from the vehicle. For instance, the audible cues may increase in volume or decrease in period or tempo (i.e. the amount of time between beeps or chirps may decreases or the speed at which a sound is played may increase) if the passenger is moving towards the vehicle. Similarly, the audible cues may decrease in volume or increase in period if the passenger is moving away from the vehicle.

Although each of the examples above relate to audible cues being beeping or chirping noises, the audible cues may take on other forms as well. For instance, the audible cues may include songs, words, or phrases ("Your car is arriving", "Your call is pulling over", "Your car is waiting for you", "Your car needs to move," etc.). In the event that the vehicle is unable to continue waiting in the pull over location, the computing devices 110 may send a signal to the server computing devices 410 and/or directly to the client computing device 420. The server computing devices 410 may then relay this information to the client computing device 420 or a concierge who may reach out to the passenger in order to provide assistance. In addition or alternatively, the client computing device may provide a visual and/or audible notification to the passenger indicating that the vehicle needs to move and will return or another vehicle will be assigned to pick up the passenger.

In addition or alternatively, the content of these phrases may even be augmented by information provided by the perception system 172 and gleaned from the map information. For instance, the phrases may describe the vehicle's location, such as "Your vehicle is parked between two other vehicles," "Your vehicles is parked 50 feet west of a fire hydrant," "Your vehicle is parked in a parking spot by the curb in front of Restaurant A," etc. In addition, if the computing devices 110 are able to localize the passenger very well, for instance combining one or more of a GPS signal from the client computing device 420, a Bluetooth (R) signal from an authenticated client computing device, other information about the passenger (such as height, clothing, or other characteristics), and sensor data from the perception system 172, the vehicle's computing devices may provide more specific audible instructions to the client computing device and or via the speakers 154 to be played to the user such as "walk to your right along the sidewalk for 23 feet: then, step off the curb to your vehicle, which is parked 3 feet into the road" or "you are 20 feet from the front end of your vehicle."

In some instances, the tone or words of the audible cues may be personalized or set by the passenger using the application and provided to the vehicle with the additional signals by the server computing devices 410. A passenger may even request that the audible cues include a particular word or the passenger's name to further allow the passenger to distinguish between different vehicles assigned to different passengers.

To further increase the effectiveness of the audible cues, the application of the client computing device 420 may use a microphone of the client computing device 420 to record information about the sounds the passenger can hear. This information may then be sent to the computing devices 110 directly or indirectly via the server computing devices 410. The client computing devices 110 may then use this information to adjust the audible cues. This may include, for instance, increasing or decreasing the volume of the sounds of the audible cues or providing instructions such as "You are moving away from your vehicle." "You are moving towards your vehicle", etc. Alternatively, instead of or in addition to providing these instructions at the vehicle, the client computing device 420 (via the application and one or more processors of the client computing device 420) may use the recorded information to determine whether the passenger is moving away from or towards the assigned vehicle. In this way, these instructions may be provided to the passenger audibly by a speaker of the client computing device 420.

In some instances, the audible cues may also be provided to the passenger via the speaker of the passenger's client computing device. This may be combined with any of the features described above. For instance, using the orientation of the passenger's client computing device, the location of the passenger's client computing device, and the location of the vehicle, the client computing device may adjust the audible cues. All or some of this information may be determined, for instance, using GPS location of the client computing device, Bluetooth (R) signals, near field communication, information from the perception system 172 identifying physical characters of the passenger, etc. Adjusting the audible cues may include, increasing the volume, period or tempo of the audible cues provided by the client computing device as the client computing device moves towards the vehicle, and decreasing the volume, period or tempo of the audible cues provided by the client computing device as the client computing device moves away from the vehicle. Again, this may further assist the passenger in locating the vehicle.

As another example, the audible cues provided via the speaker of the client computing device may begin automatically based on the location of the vehicle relative to the pick up location, whether the vehicle's computing devices have found a pull over location, whether the vehicle is completely stopped in the pull over location, when the client computing device has been authenticated and a communication link established, distance between the vehicle and the client computing device, etc. Alternatively, these audible cues provided via the speaker of the client computing device may begin once the passenger has chosen to initiate the audible cues using the button or option described above.

In addition or as an alternative to the audible cues provided by the client computing device in the examples described above, the client computing device may provide the passenger with other forms of feedback. For instance, haptic feedback may be generated by vibrating the client computing device and used in concert with or instead of the audible cues. As with the audible cues, the intensity and frequency of the vibrations may even be adjusted as the passenger moves the client computing device away from or towards the vehicle. For instance, the vibrations may become more intense as the client computing device moves towards the vehicle, and less intense as the client computing device is moved away from the vehicle.

In addition, as with the audible cues provided via the speaker of the client computing device, such vibrations may begin automatically based on the location of the vehicle relative to the pick up location, whether the vehicle's computing devices have found a pull over location, whether the vehicle is completely stopped in the pull over location, when the client computing device has been authenticated and a communication link established, distance between the vehicle and the client computing device, etc. Alternatively, these vibrations may begin once the passenger has chosen to initiate the audible cues using the button or option described above.

Figure 10:
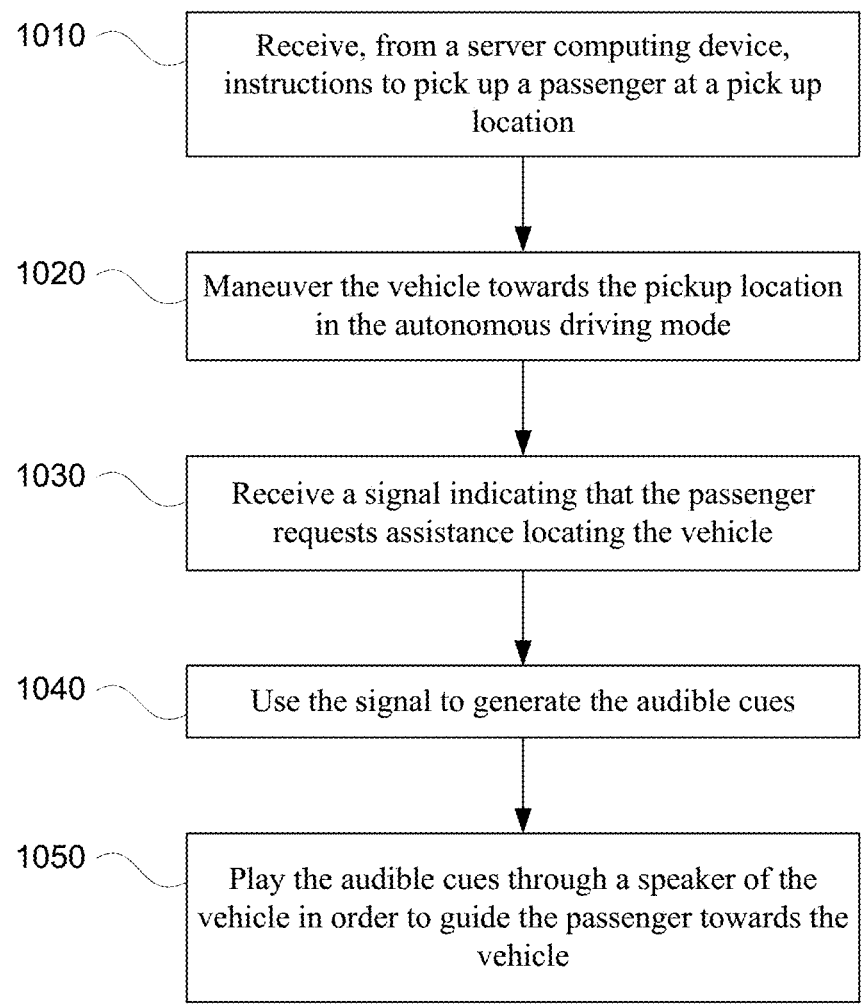
FIG. 10 is an example flow diagram in accordance with aspects of the disclosure.

FIG. 10 is an example flow diagram 1000 in accordance with some of the aspects described above that may be performed by one or more processors of one or more computing devices such as processors 120 of computing devices 110 in order to using audible cues to guide a passenger to a vehicle having an autonomous driving mode. At block 1010, instructions to pick up the passenger at a pickup location are received from a server computing device. At block 1020, the vehicle is maneuvered towards the pickup location in the autonomous driving mode. At block 1030, a signal indicating that the passenger requests assistance locating the vehicle is received. At block 1040, the signal is used to generate the audible cues. At block 1050, the audible cues are played through a speaker of the vehicle in order to guide the passenger towards the vehicle.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples: rather, the examples are intended to illustrate only one of many possible embodiments. Further, the same reference numbers in different drawings can identify the same or similar elements.

The invention claimed is:

1. A method of providing assistance to a visually impaired user, the user being associated with a client computing device, the method comprising:

maneuvering, by one or more processors of a vehicle having an autonomous driving mode, the vehicle towards a pickup location in the autonomous driving mode to pick up the user;

receiving, by the one or more processors, one or more signals from the client computing device, wherein the one or more signals indicate that the user requests audible cues to assist the user in reaching the vehicle, and the one or more signals further indicate that the user requests additional time to reach and enter the vehicle; and in response to receiving the one or more signals, providing, by the one or more processors, audible cues to guide the user to the vehicle.

2. The method of claim 1, wherein the audible cues played through one or more speakers of the vehicle.

3. The method of claim 1, wherein the audible cues are provided for a predetermined period of time.

4. The method of claim 1, wherein at least one of the one or more signals is received by the vehicle in response to the user selecting a button or option surfaced on a display of the client computing device indicating that the user requests assistance reaching the vehicle.

5. The method of claim 1, wherein the audible cues are automatically provided based on a status of the vehicle.

6. The method of claim 5, wherein the status of the vehicle includes at least one of: when the vehicle is within a predetermined distance in time or space from the pickup location, when a pull over location has been determined, when the vehicle is pulling over, when the vehicle has come to a complete stop, when the vehicle has arrived at the pull over location, when the vehicle is waiting for the passenger, when the vehicle is making the audible cues, when the client computing device has been authenticated, or when the vehicle's doors are unlocked or opened.

7. The method of claim 1, wherein the audible cues are provided until the user had reached and entered the vehicle.

8. The method of claim 1, wherein the audible cues are provided until the user opens a door of the vehicle.

9. The method of claim 1, wherein at least one of volume, period or tempo of the audible cues is adjusted based on whether the client computing device is moving towards the vehicle or the client computing device is moving away from the vehicle.

10. The method of claim 1, wherein the audible cues are adjusted as a status of the vehicle changes.

11. A vehicle for providing assistance to a visually impaired user, the user being associated with a client computing device, the vehicle having an autonomous driving mode, the vehicle comprising:

one or more external speakers; and
one or more processors configured to:
maneuver the vehicle towards a pickup location in the autonomous driving mode to pick up the user;
while the vehicle maneuvers towards the pickup location, receive one or more signals from the client computing device, wherein the one or more signals are associated with an initiation of cues to be provided by the vehicle, the one or more signals indicate that the user requests audible cues to assist the user in reaching the vehicle, and the one or more signals further indicate that the user requests additional time to reach and enter the vehicle; and
in response to receiving the one or more signals, use the one or more external speakers to provide the cues to guide the user to the vehicle.

12. The vehicle of claim 11, wherein the audible cues played through one or more speakers of the vehicle.

13. The vehicle of claim 11, wherein the audible cues are provided for a predetermined period of time.

14. The vehicle of claim 11, wherein at least one of the one or more signals is received by the vehicle in response to the user selecting a button or option surfaced on a display of the client computing device indicating that the user requests assistance reaching the vehicle.

15. The vehicle of claim 11, wherein the audible cues are automatically provided based on a status of the vehicle.

16. The vehicle of claim 15, wherein the status of the vehicle includes at least one of: when the vehicle is within a predetermined distance in time or space from the pickup location, when a pull over location has been determined, when the vehicle is pulling over, when the vehicle has come to a complete stop, when the vehicle has arrived at the pull over location, when the vehicle is waiting for the passenger, when the vehicle is making the audible cues, when the client computing device has been authenticated, or when the vehicle's doors are unlocked or opened.

17. A client computing device for providing assistance to a visually impaired user, the client computing device comprising:

a display; and
one or more processors configured to:
receive, from a vehicle having an autonomous driving mode, one or more first signals indicating a status of the vehicle as the vehicle maneuvers towards a pickup location in the autonomous driving mode to pick up a user associated with the client computing device;
surface, based on the one or more first signals, a button or option on the display indicating that the user requests assistance reaching the vehicle; and
upon the user selecting the button or option, send, to the vehicle, one or more second signals requesting initiation of audible cues to be provided by the vehicle to guide the user to the vehicle, wherein the one or more second signals indicate that the user requests additional time to reach and enter the vehicle.

18. The client computing device of claim 17, wherein the status of the vehicle indicates that the vehicle is within a certain distance or time from the pickup location.

19. The client computing device of claim 17, wherein the status of the vehicle indicates that the vehicle has come to a complete stop in a pull over location.

20. The client computing device of claim 17, wherein the status of the vehicle indicates that the vehicle is waiting for the user.

* * * * *

UNITED STATES PATENT AND TRADEMARK OFFICE
CERTIFICATE OF CORRECTION

| | |
|---|---|
| PATENT NO. | : 12,243,416 B1 |
| APPLICATION NO. | : 18/206115 |
| DATED | : March 4, 2025 |
| INVENTOR(S) | : Juliet Rothenberg and Kiran Kaja et al. |

It is certified that error appears in the above-identified patent and that said Letters Patent is hereby corrected as shown below:

In the Claims

Claim 6, Column 19, Line 33:
Now reads: "the passenger"; should read -- a passenger --

Claim 16, Column 20, Line 26:
Now reads: "the passenger"; should read -- a passenger --

Signed and Sealed this
Fifteenth Day of April, 2025

Coke Morgan Stewart
*Acting Director of the United States Patent and Trademark Office*